United States Patent [19]
Segev

[11] 3,843,059
[45] Oct. 22, 1974

[54] DEVICE FOR POSITIONING IRRIGATION PIPES AND ATTACHING RISERS THERETO

[76] Inventor: Yuval Segev, 27 Arlosoroff St., Hod Hasharon, Israel

[22] Filed: Aug. 9, 1973

[21] Appl. No.: 386,963

[52] U.S. Cl.............. 239/273, 239/212, 239/286, 239/600
[51] Int. Cl..... B05b 3/02, B05b 13/02, B05b 15/06
[58] Field of Search .......... 239/212, 207, 589, 273, 239/600, 275, 285, 286

[56] References Cited
UNITED STATES PATENTS
| | | | |
|---|---|---|---|
| 1,068,872 | 7/1913 | Eichhoff | 239/286 |
| 1,586,294 | 5/1926 | Deming | 239/286 |
| 3,179,340 | 4/1965 | Walton et al. | 239/212 |
| 3,603,508 | 9/1971 | Ingram | 239/212 X |

FOREIGN PATENTS OR APPLICATIONS
| | | | |
|---|---|---|---|
| 238,068 | 3/1962 | Australia | 239/212 |

Primary Examiner—Robert S. Ward, Jr.
Attorney, Agent, or Firm—Silverman & Cass

[57] ABSTRACT

A device for permanently positioning irrigation pipes and attaching risers for sprinklers thereto, comprising a supporting base plate which is integrally cast with a half-shell of a clamp, the other complementary half-shell of the clamp being made integral with a fitting for a riser carrying a sprinkler and having a bore communicating between said fitting and the inside of the half-shell, the clamp being adapted to position an irrigation pipe and to provide communication between it and the riser.

4 Claims, 2 Drawing Figures

PATENTED OCT 22 1974      3,843,059

DEVICE FOR POSITIONING IRRIGATION PIPES AND ATTACHING RISERS THERETO

The present invention concerns a device for positioning irrigation pipes and attaching risers thereto in a quick and easy manner.

The irrigation pipes that were used generally up to now, were made of aluminium and required to be transported from one location to the other, where they were joined by means of special connection devices to which generally risers were attached. After the pipes were laid, sprinklers were connected to these risers.

Since pipes of plastic or the like material are used more and more in irrigation, it has become possible to lay the pipes, which are wound on drums, by means of a tractor which unwinds the pipes from these drums.

A device is known for connecting risers to these flexible irrigation pipes. This device comprises two half-shells connected to each other by screws and nuts, between which shells the pipe, provided with an aperture, is clamped. The top shell is provided with an integral nozzle which penetrates into the said aperture of the pipe and which is in communication with a riser integral with the top of said shell.

The main drawback of this device is the fact that the connection of the two shells by means of screws and nuts is difficult and time consuming, the screws or nuts are easily lost, and are apt to become clogged with earth, so that screwing one to the other sometimes becomes impossible. Furthermore, no means are provided to assure the proper placement of the device so that the riser will always extend vertically.

It is the object of the present invention to provide a device which will be quickly assembled, can not be clogged and can be quickly and securely placed in position so that the riser always will extend vertically.

The invention is illustrated, by way of example only, in the accompanying drawings, in which.

Figure 1:
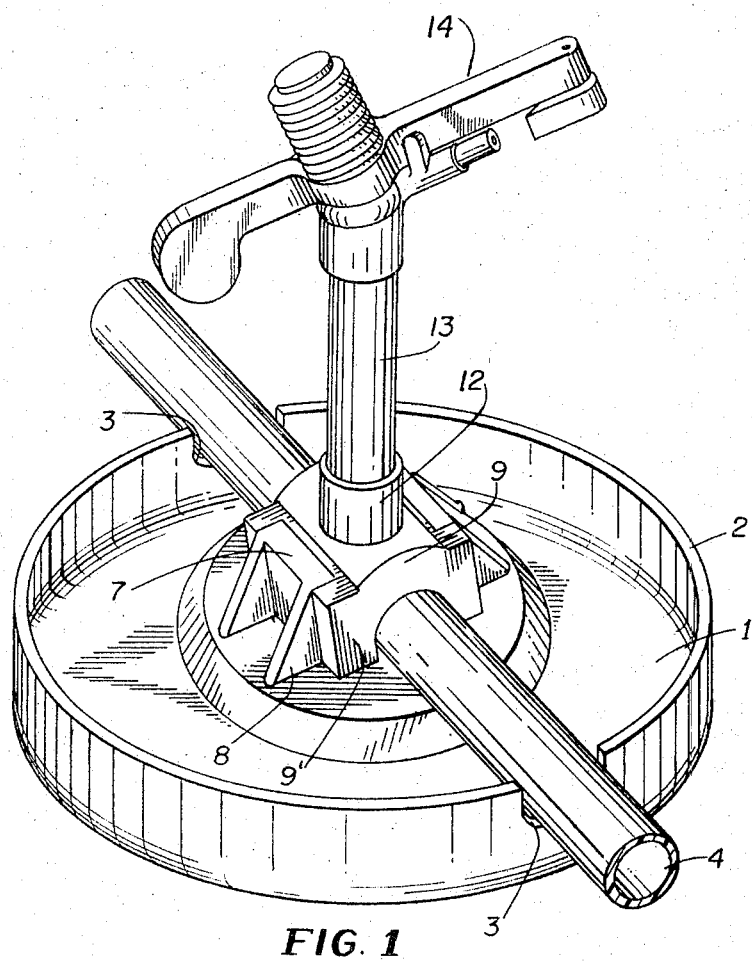
FIG. 1 is a perspective view of the device for positioning an irrigation pipe and attaching a riser thereto according to the invention.
Figure 2:
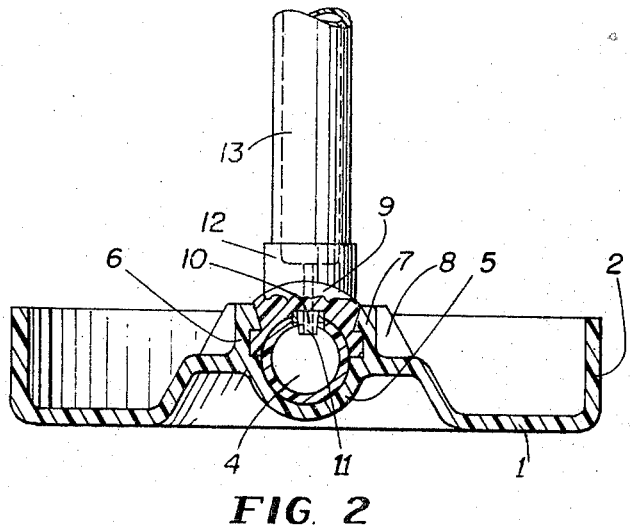
FIG. 2 is a vertical cross-section thereof.

The device according to the invention is made of plastic and comprises a dish-shaped base plate 1 having a peripheral integral rim 2 in the top of which two diametrically opposed cut-outs 3 are made in which the irrigation pipe 4 is adapted to be inserted, the cut-outs serving as a guide for the positioning of the pipe 4. An elongated half-shell clamp part 5 in which pipe 4 is to be disposed is made integral with the center of the base plate 1. The clamp part 5 has two integral upwardly extending slightly resilient longitudinal walls 6, whose top edges 7 constitute the clamping members. Webs 8 at the outside of walls 6 provide reinforcement therefor, and prevent said walls from being spread too far apart.

The complimentary part of the clamp is constituted by an elongated half-shell 9 which is longer than clamp part 5, having integral outwardly extending projections 9' at both ends between which walls 6 of clamp part 5 extend, whereby a longitudinal movement between both clamp parts is prevented. A bore 10 is made in half-shell 9 at a right angle to its axis and communicates on the one hand with an integral downwardly extending nozzle 11 and on the other, with a bushing 12 made integral with the top of half-shell 9. A riser 13 may be cast integrally with bushing 12 or may be made as a separate part and be screwed into it, said riser supporting a sprinkler 14.

Thus when a pipe 4 has been placed on clamp part 5 and into cut-outs 3, the clamp part 9 is placed on top of the pipe so that its nozzle 10 is inserted into a hole made in the wall of the pipe for this purpose. During this movement the walls 6 will be deflected slightly until the clamp part 9 is engaged by clamping member 7 whereby the pipe is now tightly clamped between half-shells 5 and 9.

To remove the top part of the clamp, the body 9 is pushed slightly sideways and owing to its resiliency, wall 6 on said side will yield slightly whereby first one side and then the opposite side are removed from the corresponding clamp members 7.

In order to position plate 1 where required, it is usually sufficient to weight it down with some soil placed therein. However, apertures (not shown) may be provided therein permitting pins or the like to extend therethrough and into the ground to anchor the device, or alternately, the plate may be cast integrally with lugs (not shown) into which dowel pins may be inserted. In the case where pipe 4 is made of non-elastic material, a washer (not shown) is threaded onto nozzle 11 to assure a proper seal.

What is desired to be secured by Letters Patent of the United States is:

1. A device for permanently positioning irrigation pipes, said device made of plastic material and comprising:
   A. means for attaching a riser to the device,
   B. a base plate having a peripheral rim including cut-outs in diametrically opposite positions for receiving an irrigation pipe,
   C. a first half-shell clamp part integrally cast with the base plate in the center thereof, said first clamp part having longitudinal walls extending upwardly,
   D. a second half-shell clamp part,
   E. means on the second clamp part for engaging and locking the longitudinal walls of the first clamp part,
   F. a connector member integrally connected with said second clamp part including means for attaching a riser thereto, and
   G. said second clamp part having a bore extending at a right angle to the axis thereof, and constructed to communicate with said connector member and the irrigation pipe, wherein the irrigation pipe when laid in said cut-outs may be locked between the first and second clamp parts.

2. The device as set forth in claim 1 in which the second clamp part comprises a nozzle integrally connected therewith, said bore communicating with said nozzle, said nozzle extending into an aperture in the irrigation pipe.

3. The device as set forth in claim 1 in which said second clamp part comprises projections extending outward from the ends thereof, said longitudinal walls of the first clamp part extending between said projections.

4. The device as set forth in claim 1 in which said first clamp part comprises web members on the outer sides of said longitudinal walls for reinforcing said walls.

* * * * *